(12) United States Patent
Csaszar (10) Patent No.: US 9,928,051 B2
(45) Date of Patent: *Mar. 27, 2018

(54) SYSTEM AND METHOD FOR INSTALLING A CLIENT APPLICATION USING A LIGHT INSTALLER

(71) Applicant: Dropbox, Inc., San Francisco, CA (US)

(72) Inventor: Ambrus Csaszar, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/067,381

(22) Filed: Mar. 11, 2016

(65) Prior Publication Data

US 2016/0196126 A1   Jul. 7, 2016

Related U.S. Application Data

(63) Continuation of application No. 14/103,378, filed on Dec. 11, 2013, now Pat. No. 9,298,439.

(Continued)

(51) Int. Cl.
   G06F 9/445   (2006.01)
   H04L 29/08   (2006.01)
   G06F 21/12   (2013.01)

(52) U.S. Cl.
   CPC ............. *G06F 8/61* (2013.01); *G06F 21/12* (2013.01); *G06F 21/121* (2013.01); *H04L 67/04* (2013.01); *H04L 67/10* (2013.01); *H04L 67/34* (2013.01)

(58) Field of Classification Search
   None
   See application file for complete search history.

(56) References Cited

U.S. PATENT DOCUMENTS 6,049,670 A   4/2000 Okada et al.
8,201,231 B2  6/2012 Williams et al.
(Continued)

FOREIGN PATENT DOCUMENTS

EP   1 760 991 A2   3/2007
WO   02/23432 A1    3/2002

OTHER PUBLICATIONS

IEEE, "How Do I Install Google Drive on My Computer?" IEEE Support Center, Jun. 14, 2013, supportcenter.ieee.org/app/answers/detail/a_id/690/~/how-do-i-install-google-drive-on-my-computer%3F.*

(Continued)

*Primary Examiner* — Wei Zhen
*Assistant Examiner* — Binh Luu
(74) *Attorney, Agent, or Firm* — Polsinelli PC (57) ABSTRACT

A light installer can be utilized to improve the installation process of a client-side application. A light installer can be an installer containing only the necessary information to initiate the installation process, such as information necessary for prompting the user for required data and authorizations, communicating with the content management system, downloading additional resources, and installing the client-side application. The light installer can minimize user interaction time by obtaining all necessary user authorizations early in the installation process, thereby enabling the light installer to install all components of the client-side application without further authorization from the user. Further, the light installer can be tagged with data identifying a user account associated with the client device that can be used for reporting, pre-populating data during the installation process, customizing the installation process, pre-authorizing the client-side application, etc.

20 Claims, 5 Drawing Sheets

Related U.S. Application Data (60) Provisional application No. 61/846,968, filed on Jul. 16, 2013.

(56) References Cited

U.S. PATENT DOCUMENTS

| | | |
|---|---|---|
| 8,219,652 B2 | 7/2012 | Newton et al. |
| 8,234,302 B1 | 7/2012 | Goodwin et al. |
| 2006/0143135 A1 | 6/2006 | Tucker et al. |
| 2008/0077915 A1 | 3/2008 | Kahan et al. |
| 2008/0209544 A1 | 8/2008 | Kempka |
| 2009/0183151 A1 | 7/2009 | Gharabally et al. |
| 2010/0146500 A1* | 6/2010 | Joubert .................... G06F 8/61 717/178 |
| 2010/0162234 A1 | 6/2010 | Wang et al. |
| 2011/0179411 A1 | 7/2011 | Lederer |
| 2012/0131570 A1 | 5/2012 | Kaikkonen et al. |
| 2013/0019234 A1 | 1/2013 | Pardehpoosh et al. |
| 2013/0019237 A1* | 1/2013 | Pardehpoosh ..... G06Q 30/0609 717/171 |
| 2014/0214670 A1 | 7/2014 | McKenna |
| 2016/0019536 A1* | 1/2016 | Ortiz .................. G06Q 20/3221 705/67 |

OTHER PUBLICATIONS

Grahl, Hendrik. "LDAP Single Sign on." Drupal, Jul. 21, 2011, www.drupal.org/project/ldap_sso. Accessed Jun. 26, 2017.*

International Search Report and Written Opinion dated Oct. 24, 2014 in International Application No. PCT/US2014/045378, filed on Jul. 3, 2014, Applicant Dropbox, Inc., 12 pages.

"Installing Google Drive for Windows 7." Case Western Reserve University, Jul. 12, 2012. Web. Dec. 29, 2014. <http://www.case.edu/its/training/materials/googleapps/GA_DOC_GoogleDriveWin7.pdf>.

* cited by examiner

SYSTEM AND METHOD FOR INSTALLING A CLIENT APPLICATION USING A LIGHT INSTALLER

CROSS REFERENCE TO RELATED APPLICATIONS

This application is a continuation of U.S. patent application Ser. No. 14/103,378, filed on Dec. 11, 2013, which claims priority to U.S. provisional application No. 61/846,968, filed on Jul. 16, 2013; both of which are expressly incorporated by reference herein in their entireties.

TECHNICAL FIELD

The present technology pertains to installing a client-side application, and more specifically pertains to utilizing a light installer to install the client-side application.

BACKGROUND

Many cloud services can be accessed from a client device using a web browser or a client-side application associated with the cloud service. While a client-side application can provide additional functionality, users often choose to use the web browser because the client-side application must be downloaded and installed on their client device, whereas a web browser application is often already available to the user. Downloading the client-side application can be burdensome for the user. For example, the download and installation process can be lengthy and require the user to remain at their client device to provide periodic input for the download and installation process to continue.

As a result, many users will not complete the download and installation process because the process takes too long. Users may exit the download and installation process prematurely, lose interest, or forget that the download and installation is being performed. An additional problem that can occur is that, in some instances, a user will create a new account when installing the client-side application, rather than using the account credentials used when accessing the service through the web browser.

In addition to these potential problems associated with downloading and installing a client-side application, data identifying the problems faced by the users is often unavailable. For example, the download process is often initiated prior to receiving any user login information, and thus it may not be possible to tell which users are having issues. Further, data indicating that the user reached a predetermined milestone in the download and installation process may also not be available. Accordingly, an improved system is needed.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for utilizing a light installer to install a client-side application on a client device. A light installer can be an installer containing only the necessary information to initiate the installation process, such as information necessary for prompting the user for required data and authorizations, communicating with the content management system, downloading additional resources, and installing the client-side application. By minimizing the size of the light installer, the light installer can be downloaded quickly and installation of the client-side application can begin shortly thereafter.

Further, the light installer can be configured to minimize user interaction time with the installation process. For example, the light installer can be configured to prompt the user for any necessary information and authorizations early in the installation process. Further, the light installer can request admin authorization enabling the light installer to install all components of the client-side application without further authorization from the user. The combination of quick download time, pushing all user interaction earlier in the installation process, and obtaining admin authorization can result in greatly minimizing the time from a user requesting to install the client-side application to the user providing all necessary input for the installation. This can increase the probability that a user will complete the installation of the client-side application.

In some embodiments, the content management system can tag the light installer with data that will be used during the installation process. For example, the light installer can be tagged with data identifying a user account associated with the client device. The tagged data can be used for reporting, pre-populating data during the installation process, customizing the installation process, etc.

Further, in some embodiments, the tagged data can be used to pre-authorize the client-side application upon completion of the installation process. Pre-authorizing the client-side application can include automatically logging the client-side application into an account associated with the client device. This can include granting the client-side application access to the user account on the content management system.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for utilizing a light installer to install a client-side application on a client device. A light installer can be an installer containing only the necessary information to initiate the installation process, such as information necessary for prompting the user for required data and authorizations, communicating with the content management system, downloading additional resources, and installing the client-side application. By minimizing the size of the light installer, the light installer can be downloaded quickly and installation of the client-side application can begin shortly thereafter.

Further, the light installer can be configured to minimize user interaction time with the installation process. For example, the light installer can be configured to prompt the user for any necessary information and authorizations early in the installation process. Further, the light installer can request admin authorization enabling the light installer to install all components of the client-side application without further authorization from the user. The combination of quick download time, pushing all user interaction earlier in the installation process, and obtaining admin authorization can result in greatly minimize the time from a user requesting to install the client-side application to the user providing all necessary input for the installation. This can increase the probability that the user will complete the installation of the client-side application.

In some embodiments, the content management system can tag the light installer with data that will be used during the installation process. For example, the light installer can be tagged with data identifying a user account associated with the client device. The tagged data can be used for reporting, pre-populating data during the installation process, customizing the installation process, etc.

Further, in some embodiments, the tagged data can be used to pre-authorize the client-side application upon completion of the installation process. Pre-authorizing the client-side application can include pre-populating user account credentials. Alternatively, pre-authorizing can include automatically logging the client-side application into an account associated with the client device. This can include granting the client-side application access to the user account on the content management system.

Figure 1:
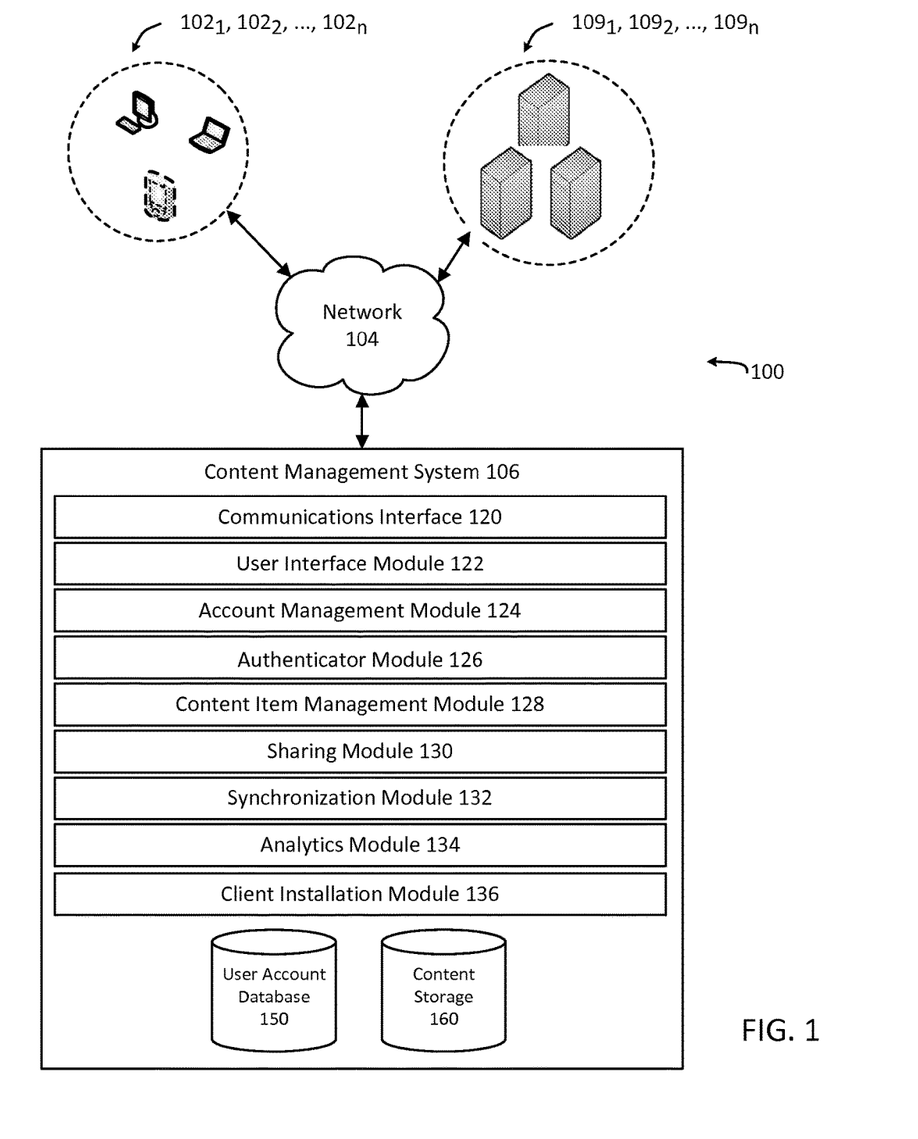
FIG. 1 shows an exemplary configuration of devices and a network in accordance with the invention.

An exemplary system configuration 100 is illustrated in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1$, $102_2$, . . . , $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include folders of various types with different behaviors, or other mechanisms of grouping content items together, such as collections, playlists, albums, etc. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers $109_1, 109_2, \ldots, 109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or less components are also possible. For example, in some embodiments, content management system 106 can provide a light installer to client device $102_i$ configured to install the client-side application enabling client device $102_i$ to interact with content management system 106. A light installer can be an application configured to minimize the user time and interaction necessary to install the client-side application on client device $102_i$, thus increasing the likelihood that installation of the client-side application will be completed.

To accomplish this, content management system 106 can include client installation module 136 configured to provide the light installer to client device $102_i$, and communicate with the light installer to aid in installation of the client-side application on client device $102_i$. To minimize the amount user time and interaction necessary to install the client-side application, the light installer can include only the data necessary to initiate installation of the client-side application. For example, the light installer can include just the data necessary to enable client device $102_i$ to interact with content management system 106 to begin the installation process, as well as prompt the user for any required information and/or authorizations.

By reducing the size of the light installer to include only the data necessary to initiate installation of the client-side application, the download time necessary to begin installing the light installer can be reduced considerably. This can result in the user initiating the installation process of the client-side application as soon as possible after requesting to download the client-side application, thus minimizing the chance that a user will forget to complete or abort the process.

Further, the light installer can be configured to minimize the user interaction time necessary to install the client-side application. For example, the installation process may require a user to enter necessary information such as a username, password, contact information, etc. Further, the installation process may require a user to authorize the light installer to install the client-side application on client device $102_i$. This can include granting the light installer admin rights to freely install any further components of the light installer. To minimize the user interaction time, the light installer can be configured to prompt the user for any required information early in the installation process. Further, the light installer can be configured to prompt the user to grant the light installer admin rights to install any further components of the client-side application. By obtaining the required information and authorizations from the user early in the installation process, the user can quickly perform all necessary interactions without waiting for a prolonged time or having to repeatedly return to the installer, resulting in the user losing interest or forgetting about the installation.

To provide client device $102_i$ with the light installer, client installation module 136 can be configured to transmit the light installer to client device $102_i$ in response to client device $102_i$ requesting to install the client-side application. For example, a user can interact with content management system 106 using a different application such as a web browser or app store application to request to install the client-side application on client device $102_i$. In response to receiving the request, client installation module 136 can be configured to transmit the light installer to client device $102_i$.

Once the light installer has been downloaded to client device $102_i$, the light installer can initiate installation of the client-side application. This can include prompting the user for required data and authorizations, creating application folders on client device $102_i$, and transmitting gathered data to content management system 106, and requesting resources required to complete the installation of the client-side application.

In some embodiments, client installation module 136 can be configured to tag the light installer with information prior to transmitting the light installer to client device $102_i$. Tagging the light installer with information can include embedding data within the light installer.

In some embodiments, client installation module 136 can be configured to tag the light installer with data associating the light installer with an existing user account on content management system 106. For example, a user that created a user account using a web browser application may wish to install the client-side application. Client installation module 136 can be configured to determine that the requesting user has an existing account and tag the light installer with data based on the existing account. For example, the data can include a unique account identifier used to identify the existing user account.

To determine whether the requesting user has an existing user account, in some embodiments, client installation module 136 can be configured to detect whether the requesting user is currently logged into a user account when the request to download the client-side application was made. For example, a user may be logged into their user account using a web browser application and then request to download the client-side application via the web browser application. If client installation module 136 detects that the requesting user is currently logged into an existing user account, client installation module 136 can then determine that the requesting user has an existing user account.

Alternatively, in some embodiments, client installation module 136 can be configured to detect that the requesting user has an existing user account based on client device $102_i$. For example, in some embodiments, client installation module 136 can be configured to gather a unique identifier identifying client device $102_i$ and then use the unique identifier to search for any user accounts authorized on client device $102_i$. In some embodiments, client installation module 136 can receive the unique identifier from client device $102_i$ as part of the request to download the client-side application. Alternatively, client installation module 136 can be configured to communicate with client device $102_i$ to request and receive the unique identifier.

The data tagged to the light installer can be used for numerous purposes. In some embodiments, the tagged data can be used for reporting purposes. For example, the light installer can be configured to periodically transmit information to content management system 106 notifying content management system 106 about the progress of the installation of the client-side application. This periodic reporting can include the embedded data identifying the user account, thus enabling the content management system to associate the progress report with an existing account. If the user fails to complete the installation, content management system 106 can send a reminder or incentive to the user.

The light installer can be configured to transmit the reporting messages when the installation process reaches certain predetermined milestones, such as the user entering the requested data, the user providing authorization, specified percentage of data being downloaded, download completing, etc. Further, the light installer can be configured to transmit reporting messages if an error or problem arises during the installation process, or alternatively, if the installation process is canceled.

In addition to reporting, the tagged data can also be used to ensure that the user uses their existing account to install the client-side application, rather than creating a new account. In some instances, a user may accidentally or unknowingly enter new login information when installing the client-side application, thus resulting in two separate user accounts on content management system 106. This is undesirable because the user's content will be split across the two accounts creating user confusion, or the user may abandon the first account leading to the potential for many unused user accounts within content management system 106.

To discourage the user from creating a new account when installing the client-side application, in some embodiments, the data tagged to the light installer can be used to pre-populate user account data, such as user credentials. For example, the data tagged to the light installer can include an e-mail address or username associated with the user's existing user account. This data can be pre-populated in the appropriate field during installation, thus prompting the user to enter the appropriate password associated with the user account.

Alternatively, in some embodiments, the light installer can be configured to prompt a user differently based on the data tagged to the light installer. For example, if the light installer is tagged with data identifying an existing user account, the light installer can be configured to prompt the user to enter a username and password for an existing user account. Alternatively, if the light installer is not tagged with data or tagged with data indicating that there is no existing user account associated with the requesting user, the light installer can prompt the user to enter data to create a new account.

Further, in some embodiments, the data tagged to the light installer can be used to pre-authorize the client-side account upon installation being completed. Pre-authorizing the client-side application can include pre-populating user account credentials. Alternatively, pre-authorizing can include automatically logging the user into their account. To accomplish this, the user credentials supplied via the web browser can be provided to the client-side application to authorize access to the same user account, such as through a secure token exchange. Thus a user that logs into their account using a web browser application and then initiates installation of the client-side application while still logged in to their account, can be automatically logged into their account on the client-side application as part of the installation process.

In this type of embodiment, upon receiving a request from client device $102_i$ to install the client-side application, client installation module 136 can be configured to determine if the requesting user is currently logged into a user account. For example, client installation module 136 can determine if client device $102_i$ has logged into a user account using, for example, a web browser application. If client installation module 136 determines that client device $102_i$ is logged into a user account, client installation module 136 can tag the light installer with data identifying the user account. The light installer can then transmit the tagged data identifying the user account to content management system 106 upon completion of installation of the client-side application and content management system 106 can then authorize the client-side application to login to the identified account.

In some embodiments, content management system 106 can require data in addition to the tagged data to pre-authorize the client-side application to access the user account. For example, if a user shares the light installer downloaded to client device $102_i$ with a friend, the user would not want the friend to be pre-authorized to access the user's user account. Accordingly, content management system 106 can require additional information to determine that the client-side application is installed on the appropriate user's client device.

In some embodiments, content management system 106 can require an authorization that the client device installing the client-side application is the same client device that the light installer was initially downloaded to. For example, client installation module 136 can be configured to tag the light installer with data identifying the requesting client device. Thus, if a request is received from client device $102_i$, client installation module 136 can tag the light installer with data identifying client device $102_i$ as well as the user account. The light installer can then transmit the data identifying client device $102_i$ to content management system 106 when installation of the client-side application is completed. Content management system 106 can then condition pre-authorization based on whether the client device that installed the client-side application matches the client device identified by the tagged data.

Figure 2:
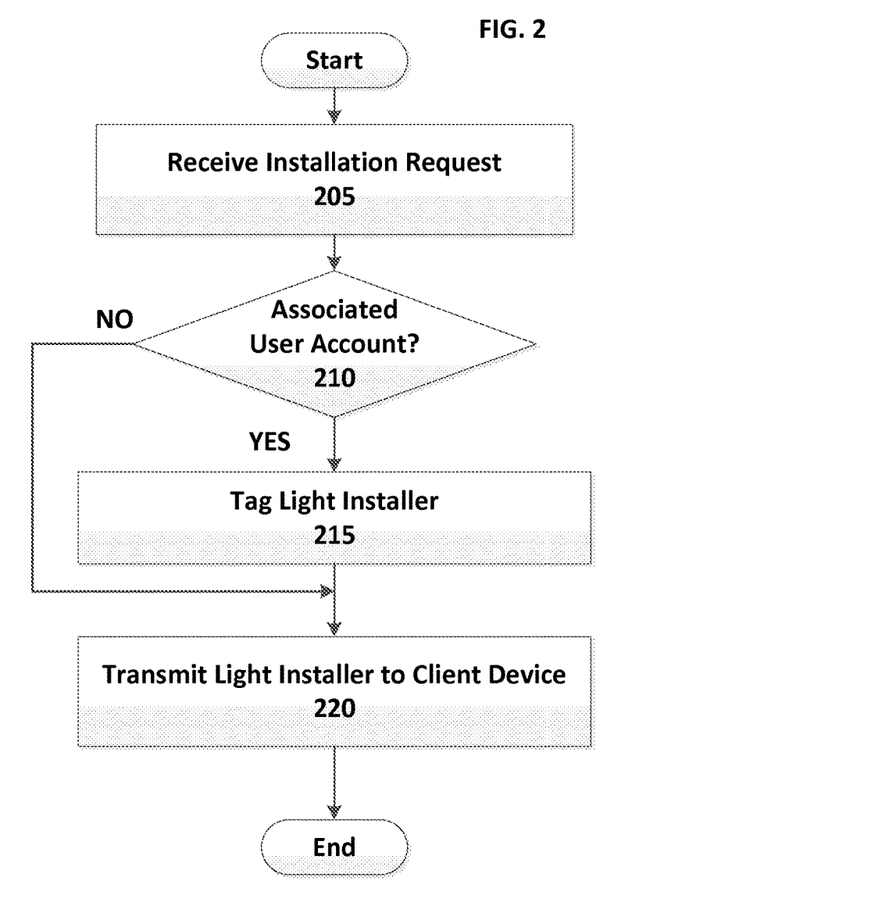
FIG. 2 shows an exemplary method embodiment of tagging a light installer.

FIG. 2 shows an exemplary method embodiment of a content management system tagging a light installer for a requesting client device. As shown, the method begins at block 205 where the content management system receives an installation request from a client device. The installation request can be a request to install a client-side application on the client device. For example, the request can be received as a result of a user selecting to install the client-side application using a web browser or app store application to communicate with the content management system.

Upon receiving the installation request, the method continues to block 210 where the content management system determines whether the requesting client device is associated with an existing user account on the content management system. In some embodiments, the content management system can determine if the client device is currently logged into a user account through, for example, a web browser application. Alternatively, in some embodiments, an identifier identifying the client device can be used to search for any user accounts authorized on the client device.

If at block 210 it is determined that a user account is associated with the requesting client device, the method continues to block 215 where a light installer configured to install the client-side application is tagged by the content management system. Tagging the light installer can include embedding data into the light installer. For example, the light installer can be tagged with data identifying the user account associated with the client device, such as a unique account identifier Alternatively, login data associated with the account such as the user's login can be embedded in the light installer.

In addition to data identifying the user account, the light installer can be tagged with data identifying the client device. For example, a unique device identifier for the client device can be embedded in the light installer.

The method then continues to block 220 where the content management system transmits the tagged light installer to the requesting device. If at block 210 it is determined that a user account is not associated with the client device or a user account with the client device cannot be identified, the method continues to block 220 where the light installer is transmitted to the client device without any tagged data. Alternatively, in some embodiments, the light installer can be tagged with data indicating that a user account is not associated with the client device. The method then ends.

Figure 3:
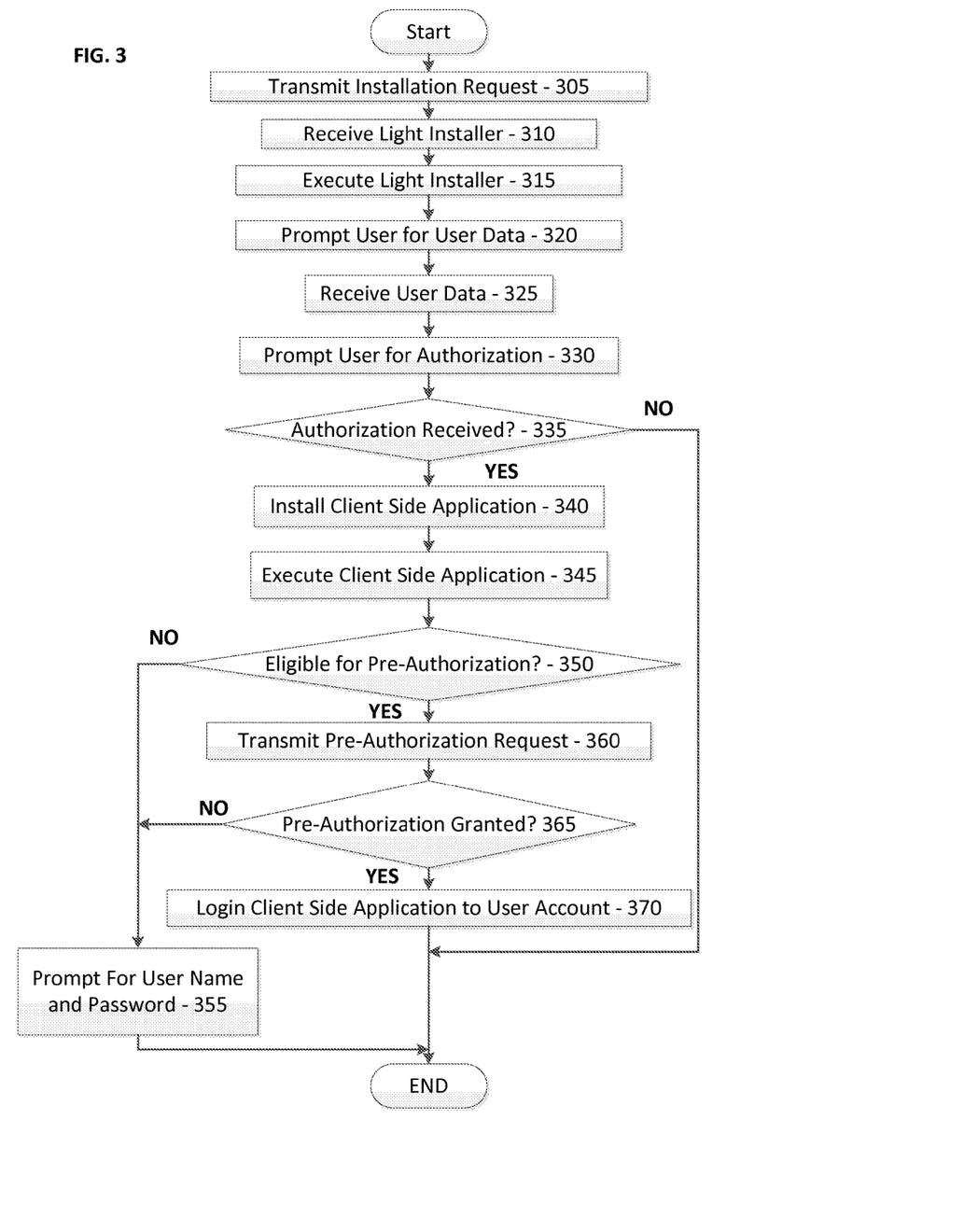
FIG. 3 shows an exemplary method embodiment of installing a client-side application using a light installer.

FIG. 3 shows an exemplary method embodiment of a client device installing a client-side application from a content management system using a light installer. As shown, the method begins at block 305 where an installation request is transmitted to the content management system. The installation request can be transmitted in response to a user selecting to download the client-side application. In some embodiments, the installation request can include data such as a unique device identifier identifying the client device or account credentials.

Upon transmitting the installation request, the method continues to block 310 where a light installer is received from the content management system. The light installer can be an application configured to install the client-side application on the client device.

The method then continues to block 315 where the client device executes the light installer. The method then continues to block 320 where the light installer prompts the user for data based on any data tagged to the light installer. Prompting the user for data can include providing the user with a user interface where the user can enter requested data. In some cases, the user interface presented can be varied based on the tagged data. For example, some fields of the data interface can be pre-populated with tagged data, such as a user login or e-mail address associated with a user account associated with the client device. In another example, if the light installer is tagged with data indicating that the client device is associated with an existing user account, the user can be prompted to enter a user name and password for an existing user account. Alternatively, if the light installer is tagged data indicating that an existing user account could not be identified, the user can be prompted to create a new user account.

The method then continues to block 325 where the requested user data is received from the user. The method then continues to block 330 where the client device presents an interface prompting the user for authorization to install the client-side application. This can include requesting admin rights for the light installer that can enable the light installer to install the client-side application without further authorization from the user.

At block 335 it is determined if the requested authorization is received. If the requested authorization is not received, the method ends without the client-side application being installed on the client device. Alternatively, if at block 335 the requested authorization is received, the method continues to block 340 where the client-side application is installed. This can include requesting data from the content management system, creating application directories on the client device, and installing the client-side application on the client device.

After the client-side application is installed, the method continues to block 345 where the client-side application is executed. The method then continues to block 350 where it is determined whether the client-side application can be pre-authorized. For example, if the light installer was tagged with data identifying a user account, the client-side application can be pre-authorized, resulting in the client side application being automatically logged into the user account.

If at block 350 it is determined that the client-side application cannot be pre-authorized, the method continues to block 355 where the user is prompted for a user name and login and the method ends. Alternatively, if at block 350 it is determined that the client-side application can be pre-authorized, the method continues to block 360 where a pre-authorization request is transmitted to the content management system. The pre-authorization request can include the data tagged to the light installer as well as additional data such as a device identifier identifying the client device.

If at block 365 it is determined that the pre-authorization request has been granted, the method continues to block 370 where the client-side application is logged into and given access to the user account and the method then ends. Alternatively, if at block 365 it is determined that the pre-authorization request has been denied, the method continues to block 355 where the user is prompted to enter a user name and password and the method then ends.

Figure 4:
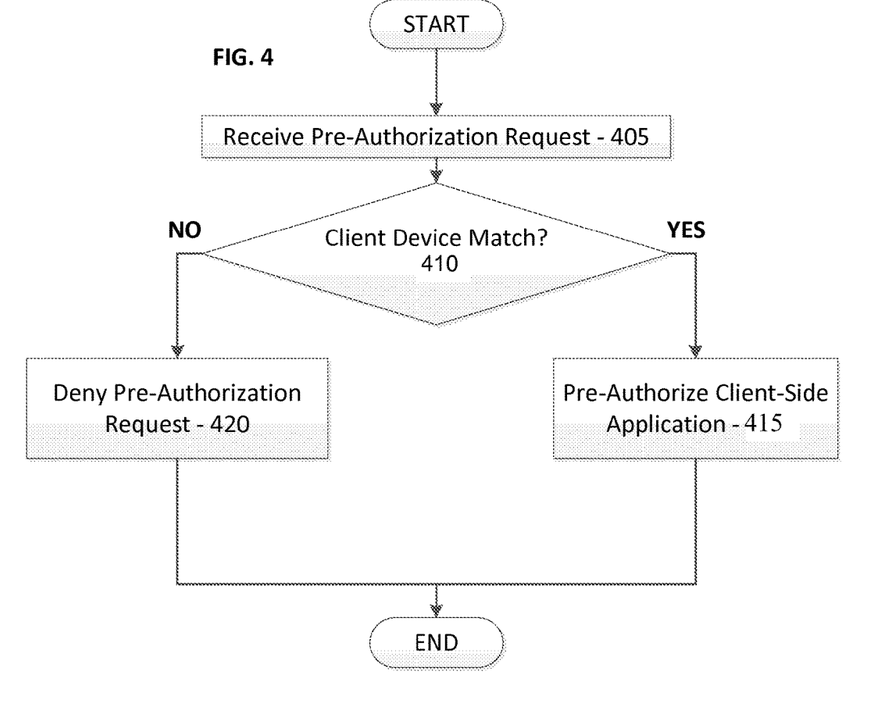
FIG. 4 shows an exemplary method embodiment of pre-authorizing a client-side application to access a user account.

FIG. 4 shows an exemplary method embodiment of a content management system granting a client-side application pre-authorization to a user account. As shown, the method begins at block 405 where a pre-authorization request is received from a client device. The pre-authorization request can be a request to pre-authorize a client-side application installed on the client device to log in to and access a user account on the content management system without requiring the user to enter login credentials.

The pre-authorization request can include data identifying the requesting client device, such as a device identifier. Further the pre-authorization request can include data tagged in a light installer used to install the client-side application on the client device. This can include an account identifier identifying a user account associated with the client device that originally downloaded the light installer from the content management system as well as a device identifier identifying the client device that originally downloaded the light installer.

At block 410 it is determined if the client device from which the pre-authorization request was received matches the client device that originally downloaded the light installer. If at block 410 it is determined that the client device from which the pre-authorization request was received matches the client device that originally downloaded the light installer, the method continues to block 415 where the pre-authorization request is approved and the method ends. Alternatively, if at block 410 it is determined that the client device from which the pre-authorization request was received does not match the client device that originally downloaded the light installer, the method continues to block 420 where the pre-authorization request is denied and the method ends.

Figure 5A:
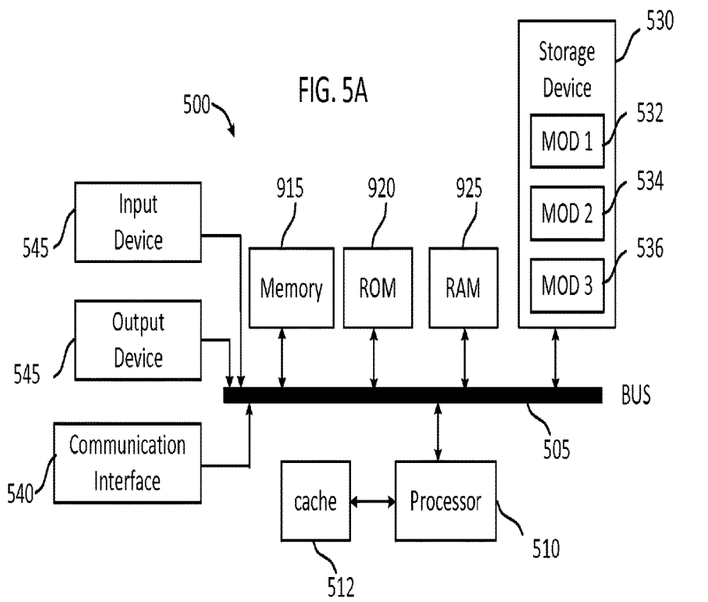
FIGS. 5A and 5B show exemplary possible system embodiments.
Figure 5B:
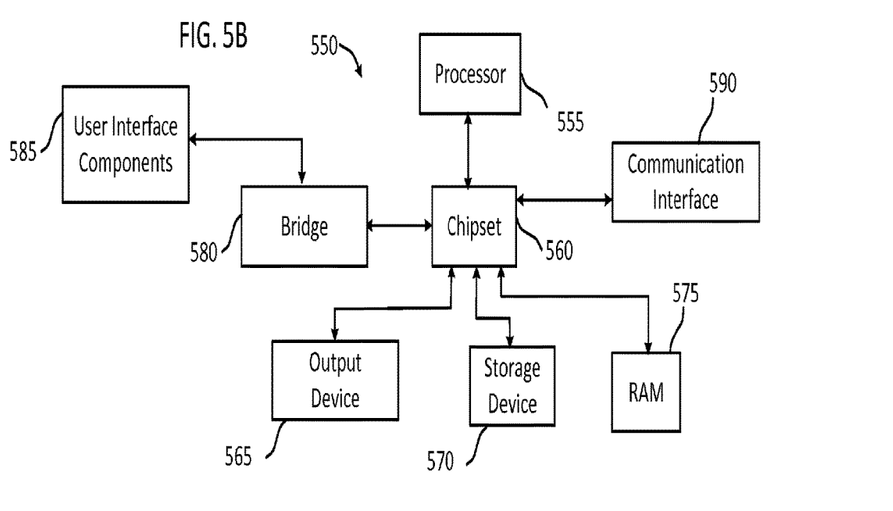

FIG. 5A and FIG. 5B show exemplary possible system embodiments. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that exemplary systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
    sending a first request to download a light installer of a client-side application associated with a content management system, the light installer being tagged with an account identifier identifying a user account registered at the content management system and a device identifier identifying a respective client device authorized to access the user account registered at the content management system, wherein the first request to download the light installer is associated with a web browser application, the respective client device being authorized to access the user account based on the web browser application being logged into the user account at the time of the first request to download the light installer;
    receiving and executing the light installer at a target client device;
    upon receiving authorization to install the client-side application at the target client device:
        transmitting, by the light installer on the target client device to the content management system, a second request to download the client-side application on the target client device; and
        downloading and installing the client-side application at the target client device;
    sending, from the target client device to the content management system, a third request to pre-authorize the client-side application to log-in to the user account at the target client device, the third request identifying the user account based on the account identifier tagged in the light installer and identifying the target client device as the respective client device authorized to access the user account based on the device identifier tagged in the light installer; and
    based on the third request identifying the user account and identifying the target client device as the respective client device authorized to access the user account, obtaining, by the target client device from the content management system, pre-authorization granting the client-side application authorization to log-in at the target client device via the user account without obtaining login credentials associated with the user account at the client-side application on the target client device.

2. The method of claim 1, further comprising:
    based on the pre-authorization to log-in, logging in the client-side application at the target client device via the user account without obtaining user input of login credentials for the user account at the target client device.

3. The method of claim 2, wherein logging the client-side application comprises pre-populating user account credentials by the light installer without user input of the user account credentials.

4. The method of claim 1, further comprising:
transmitting a progress report message including the account identifier, the progress report message indicating a current state of installation of the client-side application on the target client device.

5. The method of claim 1, wherein the respective client device and the target client device are a same client device, wherein the client identifier identifies the target client device as the same client device as the respective client device.

6. The method of claim 5, wherein the first request to download the light installer is sent via the web browser application on the target client device while the web browser application is logged into the user account.

7. A system comprising:
at least one processor; and
at least one memory containing instructions that, when executed, cause the at least one processor to:
send a first request to download a light installer of a client-side application associated with a content management system, the light installer comprising data embedded in the light installer by the content management system, the data comprising an account identifier identifying a user account at the system and a device identifier identifying a respective client device authorized to access the user account registered at the content management system, wherein the first request to download the light installer is associated with a web browser application, the respective client device being authorized to access the user account based on the web browser application being logged into the user account at the time of the first request to download the light installer;
receive and execute the light installer;
upon receiving authorization to install the client-side application:
transmit, by the light installer to the content management system, a second request to download the client-side application on the system;
download and install the client-side application on the system;
send, to the content management system, a third request to pre-authorize the client-side application to log-in to the user account, the third request identifying the user account based on the account identifier embedded in the light installer and identifying the system as the respective client device authorized to access the user account based on the device identifier embedded in the light installer;
based on the third request identifying the user account and identifying the system as the respective client device authorized to access the user account, obtain, from the content management system, pre-authorization to log-in the client-side application at the system via the user account without user input of account credentials associated with the user account at the client-side application on the system.

8. The system of claim 7, wherein the instructions further cause the at least one processor to:
based on the pre-authorization to log-in, log-in the client-side application at the system via the user account without obtaining user input of the account credentials for the user account at the client-side application on the system.

9. The system of claim 8, wherein logging in the client-side application comprises pre-populating user account credentials by the light installer without receiving user input of the user account credentials.

10. The system of claim 7, wherein the system is the respective client device, wherein the client identifier embedded in the light installer identifies the system as the same client device as the respective client device.

11. The system of claim 10, wherein the instructions further cause the at least one processor to:
obtain a progress report message including the account identifier associated with the light installer, the progress report message indicating a current state of installation of the client-side application; and
associate the progress report message with the account identifier.

12. The system of claim 7, wherein the first request to download the light installer is sent via the web browser application while the web browser is logged in at the content management system via the user account.

13. The system of claim 12, wherein the third request to pre-authorize the client-side application to log-in to the user account is sent from the system while the web browser application is not logged into the user account.

14. A non-transitory computer-readable medium comprising instructions stored thereon that, when executed by one or more processors, cause the one or more processors to:
send a first request to download a light installer of a client-side application associated with a content management system, the light installer comprising an account identifier identifying a user account at the content management system and a device identifier identifying a respective client device authorized to access the user account registered at the content management system, wherein the first request to download the light installer is associated with a web browser application, the respective client device being authorized to access the user account based on the web browser application being logged into the user account at the time of the first request to download the light installer;
receive and execute the light installer;
upon receiving authorization to install the client-side application:
transmit, via the light installer to the content management system, a second request to download the client-side application on a computing device;
download and install the client-side application on the computing device;
send, to the content management system, a third request to pre-authorize the client-side application to log-in to the user account at the computing device, the third request identifying the user account based on the account identifier embedded in the light installer and identifying the computing device as the respective client device authorized to access the user account based on the device identifier embedded in the installer;
based on the third request identifying the user account and identifying the computing device as the respective client device authorized to access the user account, obtain, from the content management system, pre-authorization to log-in the client-side application at the computing device via the user account without obtaining user input from the client-side application at the computing device of account login credentials associated with the user account.

15. The non-transitory computer-readable medium of claim 14, wherein the instructions further cause the one or more processors to:
based on the pre-authorization to log-in, log-in the client-side application at the computing device via the user account without obtaining user input of account login credentials for the user account at the computing device, wherein the computing device is a same client device as the respective client device.

16. The non-transitory computer-readable medium of claim 15, wherein logging the client-side application comprises pre-populating user account credentials by the light installer without user input of the user account credentials.

17. The non-transitory computer-readable medium of claim 14, wherein the respective client device is a same client device as the computing device.

18. The non-transitory computer-readable medium of claim 14, wherein the instructions further cause the one or more processors to:
 obtain a progress report message including the account identifier associated with the light installer, the progress report message indicating a current state of installation of the client-side application on the computing device; and
associate the progress report message with the account identifier.

19. The non-transitory computer-readable medium of claim 14, wherein the downloading and installing of the client-side application is performed without the light installer obtaining user input of the account login credentials at the computing device.

20. The non-transitory computer-readable medium of claim 14, wherein the first request to download the light installer is sent from the web browser application while the web browser application is logged into the user account at the content management system.

* * * * *